US008751363B2

(12) United States Patent
Cushing et al.

(10) Patent No.: US 8,751,363 B2
(45) Date of Patent: *Jun. 10, 2014

(54) SYSTEM AND METHOD FOR EXECUTING STRATEGY SECURITY TRADING

(75) Inventors: David C Cushing, Lexington, MA (US);
M. Mitch Bulajic, New York, NC (US);
Rohit D'Souza, New York, NY (US);
Kenneth Kramer, White Plains, NY (US)

(73) Assignee: ITG Software Solutions, Inc., Culver City, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 13/184,790

(22) Filed: Jul. 18, 2011
(Under 37 CFR 1.47)

(65) Prior Publication Data
US 2011/0276459 A1 Nov. 10, 2011

Related U.S. Application Data

(63) Continuation of application No. 12/610,958, filed on Nov. 2, 2009, now Pat. No. 7,983,982, which is a continuation of application No. 09/699,503, filed on Oct. 31, 2000, now Pat. No. 7,613,647.

(60) Provisional application No. 60/176,627, filed on Jan. 19, 2000.

(51) Int. Cl.
*G06Q 40/00* (2012.01)
(52) U.S. Cl.
USPC .......................................................... 705/37
(58) Field of Classification Search
None
See application file for complete search history.

(56) References Cited

U.S. PATENT DOCUMENTS

| 4,949,248 A | 8/1990 | Caro |
| 6,014,627 A | 1/2000 | Togher et al. |
| 6,134,535 A | 10/2000 | Belzberg |

(Continued)

FOREIGN PATENT DOCUMENTS

| TW | 326088 | 2/1998 |
| TW | 377418 | 12/1999 |

OTHER PUBLICATIONS

Clemons, Eric K; Weber, Bruce W. Restructuring Institutional Block Trading: An Overview of the Optimark System. Journal of Management Information Systems. vol. 15, No. 2. pp. 1-16, Fall 1999.

(Continued)

*Primary Examiner* — Jason M Borlinghaus
(74) *Attorney, Agent, or Firm* — Rothwell, Figg, Ernst & Manbeck, P.C.

(57) ABSTRACT

A computer implemented method and system for executing block trades for a security includes steps or devices for receiving a block trade request, at a computer system. The block request includes data representing a quantity of shares of the security to be traded over a period of time. The computer system divides the period of time into a plurality of time bins. A computer system, for the received block trade request, computes, for each time bin, a number of shares to be traded as a trading target based on at least historical trading volumes using predictive analysis. For a first time bin, a computer system generates executable trade orders for a number of shares to be traded that is substantially equal to the trading target for the first time bin. A computer system executes at least a portion of the executable trade orders in a trade forum within each time bin in the future.

12 Claims, 4 Drawing Sheets

(56) References Cited

U.S. PATENT DOCUMENTS

| | | |
|---|---|---|
| 6,285,989 B1 | 9/2001 | Shoham |
| 6,317,728 B1 | 11/2001 | Kane |
| 6,349,291 B1 | 2/2002 | Varma |
| 6,405,180 B2 | 6/2002 | Tilfors et al. |
| 6,493,682 B1 | 12/2002 | Horrigan et al. |
| 6,505,174 B1 | 1/2003 | Keiser |
| 6,560,580 B1 | 5/2003 | Fraser et al. |
| 6,594,643 B1 | 7/2003 | Freeny, Jr. |
| 6,618,707 B1 | 9/2003 | Gary |

OTHER PUBLICATIONS

ITG (Spring 2000) Introducing SPI, the newest SmartServer from ITG.

Large Order Execution in the Futures Market. The Business Lawyer. 44 Bus. Law. 1335. Aug. 1989. pp. 1-21.

PlexusGroup, Volume Weighted Average Price: Evaluation or Evasion, Aug. 1999, Commentary #59.

Large Order Execution in the Futures Markets. 44 The Business Lawyer 1335. Aug. 1989.

SYSTEM AND METHOD FOR EXECUTING STRATEGY SECURITY TRADING

CROSS REFERENCE TO RELATED APPLICATION

This application is a Continuation of and claims priority to U.S. patent application Ser. No. 12/610,958 filed Nov. 2, 2009, which is a Continuation of U.S. patent application Ser. No. 09/699,503 filed Oct. 31, 2000, now U.S. Pat. No. 7,613,647, which claimed priority to provisional application No. 60/176,627, filed Jan. 19, 2000, the contents of each of which are incorporated herein in their entirety.

FIELD OF THE INVENTION

This invention relates generally to securities markets, and more particularly relates to a system and method for executing trades of securities according to predefined strategies.

BACKGROUND OF THE INVENTION

A securities trading mechanism can be thought of as a set of protocols that translate a group of investors' latent demands into realized prices and quantities. In addition to the national and regional exchanges, there exist a number of proprietary equity trading mechanisms, such as ECNs (Electronic Communication Networks) which are tailored to handle the specialized needs of sophisticated investors and traders.

Algorithmic trading, or so-called "program trading," has been known for many years. According to such program trading, various factors such as timing, volume, individual price trends, market trends, sector trends, etc. are taken into account according to a series of rules defined by the algorithm which then determine whether to enter trade orders and what parameters to select for those trade orders. The factors considered and the manner in which those factors are incorporated or weighted in a trading algorithm are a function of the particular strategy developed by the investor.

The present invention enables trade orders to be managed and executed automatically according to one or more of a number of specific trading strategies by implementing multiple developed strategies into a number of servers and transmitting orders to a particular server running the desired trading strategy.

SUMMARY OF THE INVENTION

The present invention provides a system for executing trades of securities according to predefined trading strategies comprising a network having a plurality of servers. In preferred embodiments of the present invention, a server comprises one or more computers that act as an automated trading agent whereby it accepts orders from clients and manages and executes those orders. Each server, or "agent," is programmed with a specific trading strategy algorithm and receives trade orders and executes them according to the trading strategy algorithm programmed therein. The servers are connected to a plurality of clients over a communication network, and clients enter trade orders through the communication network to the server associated with the trading strategy the client desires to use to complete its trade order.

According to another aspect, the invention provides a method for executing a trade order for a security. The method comprises the steps of providing a server connected to a communication network, the server being programmed with a specific trading strategy algorithm; receiving at the server over the network a trade order from a customer; executing the received order in a trade forum according to the specific trading strategy algorithm; and providing an execution report to the customer over the network.

In preferred embodiments of the present invention, each server accepts order directly over the communication network from clients wishing to trade securities according to the particular strategy programmed therein. All servers have access to multiple trading destinations, access to real-time and historical market data, and real-time analytic data. Furthermore, each server has access to other servers on the communication network such that portions of given orders, or compilations of multiple orders can be routed or exchanged between the servers, and the servers can trade more efficiently and fairly among customers, based on this information.

The present invention will become more fully understood from the forthcoming detailed description of preferred embodiments read in conjunction with the accompanying drawings. Both the detailed description and the drawings are given by way of illustration only, and are not limitative of the present invention as claimed.

DETAILED DESCRIPTION OF THE INVENTION

Figure 1:
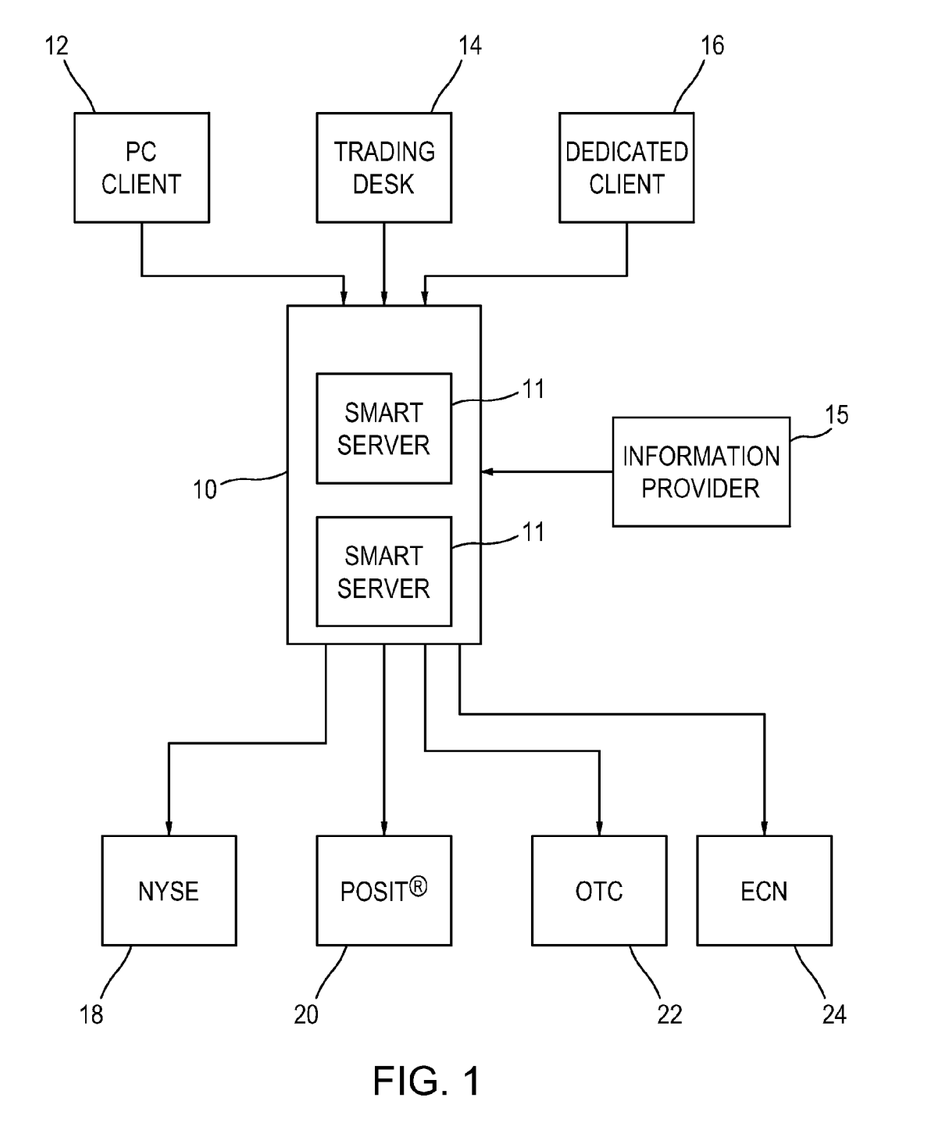
FIG. 1 is a block diagram of a system for executing trades according to a specific trading strategy according to a preferred embodiment of the invention.

Referring to FIG. 1, one or more smart servers 11 is provided on an communication network 10. The network 10 may be a public network or a private dedicated network. Each server 11 is programmed with a specific trading strategy, and has access to various trading mechanisms or exchanges through the network 10, such as the New York Stock Exchange (NYSE) 18, the POSIT® system 20, the over-the-counter (OTC) market 22 (including, but not limited to, the NASDAQ stock market), or an ECN 24. Preferably, multiple trading strategies are available on each server 11.

According to preferred embodiments of the present invention, the servers 11 are electronically accessible directly by customers through the network 10. This access can be either through a PC 12 or a dedicated client terminal 16 which is electronically connected to the network 10 such as via the Internet or a dedicated line. Alternatively, clients could submit orders to the network indirectly via a trading desk 14 through which a customer can place an order in the traditional manner through a broker.

According to preferred embodiments of the present invention, a number of different servers 11 are provided on the network, with each server 11 running a different trading strategy and having access to various appropriate trading forums, such as, for example, the New York Stock Exchange ("NYSE") 18, the POSIT® off-market trading system 20, the over-the-counter market ("OTC") 22 (including, but not limited to, the NASDAQ market), and various electronic communication networks ("ECNs") 24. A customer may place a trade order with any specific one of the servers 11 according to the strategy that the customer wishes to use to complete the order. The appropriate server 11 receives the order from the customer over the network 10 and processes the trade according to the preset trade strategy algorithm being run by the server 11. The server 11 then executes the strategized order and preferably transmits the execution results to the customer in real time.

By providing such servers, a significant advantage over the prior art system (where strategies are executed manually by human traders) is achieved. The server 11 can handle much more complex trades including trades involving large volumes and many more different equities. Additionally, the server 11 can provide expert results for a very large number of equities, unlike a trader who may be able to concentrate on or follow only a relatively small number of equities at once. A server according to the present invention has a further advantage over a human trader in that it can be electronically connected via the network 10 to a real time market information provider 15 as well as sources providing historical and derived market data such that it can receive and process multiple indicators on a continuous basis. Further, multiple orders having different desired trading strategies can be simultaneously executed by routing trade requests to the appropriate server 11.

Figure 2A:
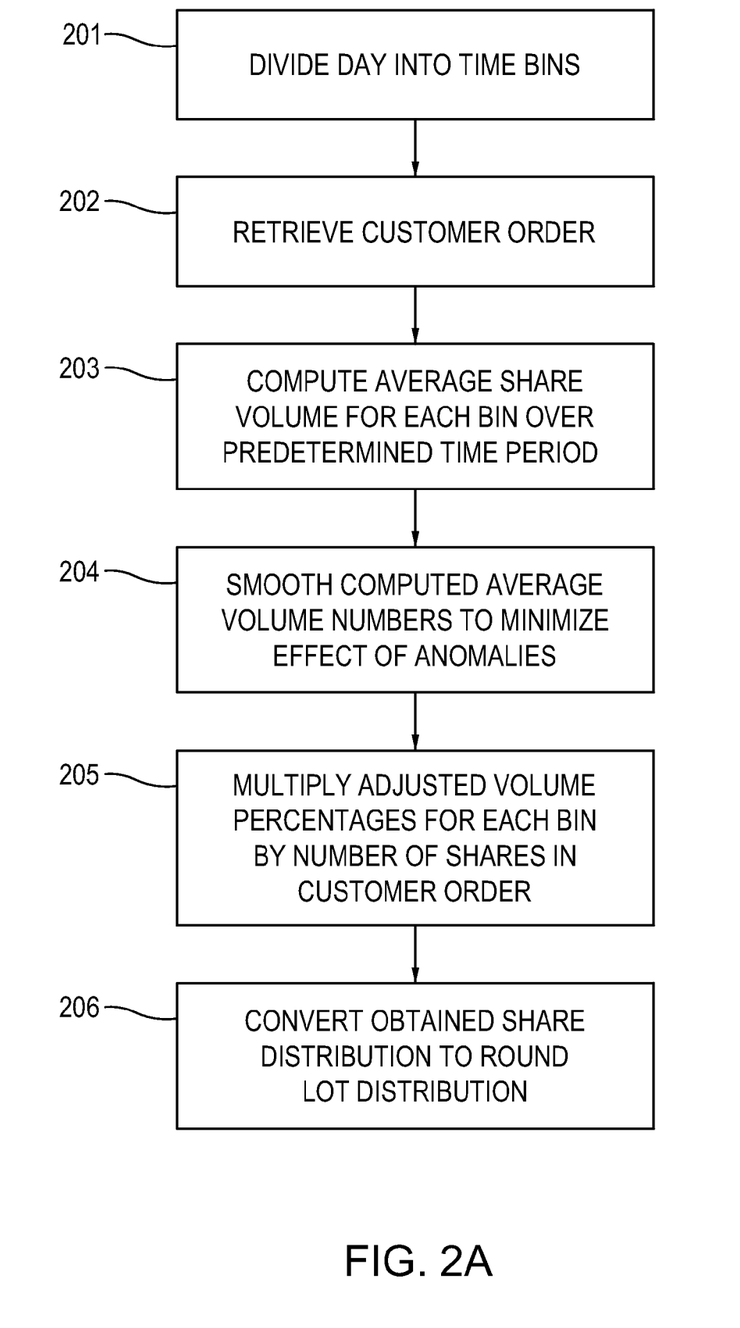
FIGS. 2A and 2B are flow charts of an exemplary trading algorithm which can be performed by a server according to an embodiment of the present invention.
Figure 2B:
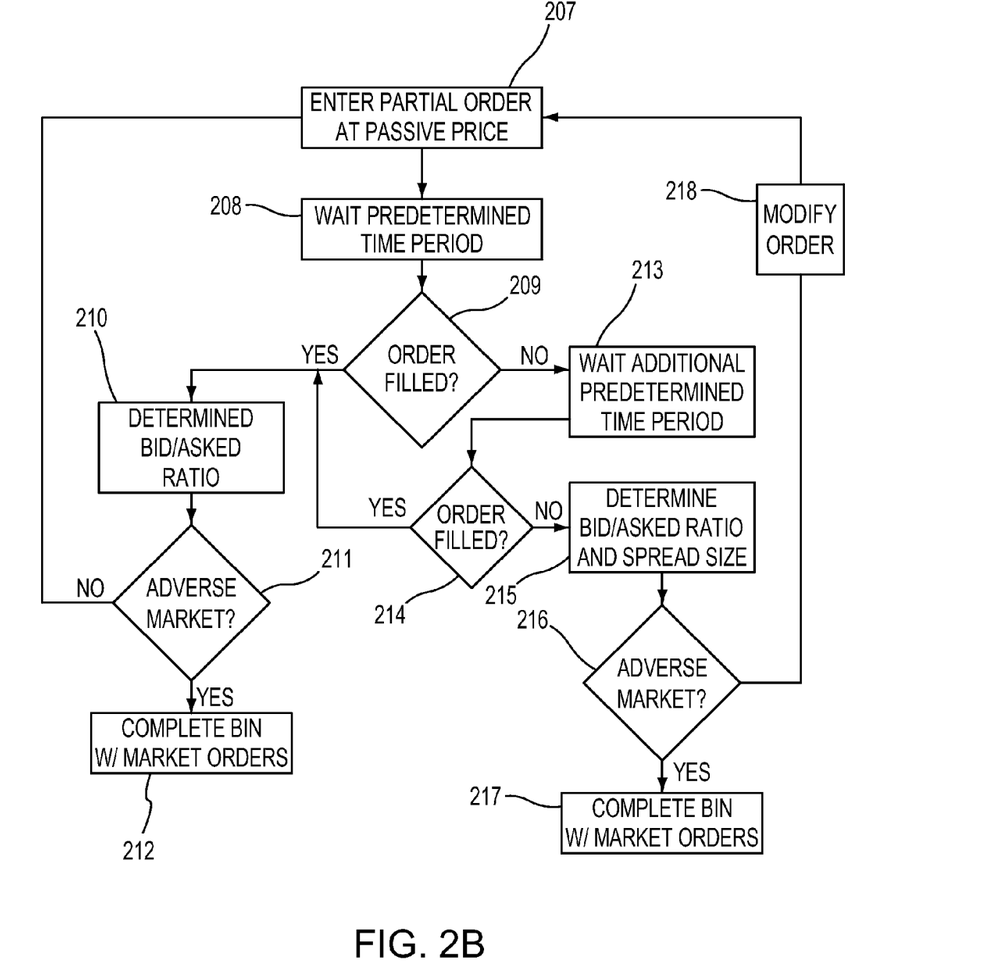

FIGS. 2A and 2B illustrate one example of an equity trading strategy which can be performed by a server 11 according to embodiments of the invention wherein trades are executed with a goal of achieving a Volume Weighted Average Price, or "VWAP." The VWAP trading algorithm is programmed into a server 11, and customers wishing to execute the VWAP strategy for trades input orders and transmit them directly to the server 11 running the VWAP strategy via the network 10.

A stock's VWAP is the average price of trades of the stock over the course of the day weighted according to the number of shares traded at each price. Thus, for example, 1000 shares traded at 56½ are weighted five times as heavily as 200 shares traded at 54¼, to give a VWAP of 56⅛. The VWAP server algorithm according to the present invention would provide an alternative to conventional trading strategies for those clients who wish to trade a block of shares of a particular security over the course of a market day (or portion thereof) at a price near the security's VWAP for that day (or for that portion). The VWAP benchmark is desirable for such traders in that it allows evaluation of the success of a trader's approach to achieving reasonable execution prices.

According to VWAP strategy as depicted in FIG. 2A, at step 201 the trading day is divided into a number of equal time bins such as, for example, bins of half-hour increments. At step 202 the customer's order is received by the smart server 11 from a source such as a dedicated terminal 16. In a typical order, a customer would state a trade side (buy or sell), a security identifier (ticker symbol), number of shares and time duration of the order. For example, a VWAP order would state a wish to buy 100,000 shares of IBM common stock before the close of the market throughout the course of a given day, or specifying some other definite expiration time for the order to be executed. The VWAP server screens orders through a number of filters, such as for securities which are not part of the server's trading universe, or for orders in excess of a preset maximum number of shares.

At step 203, the average share volume of the security in question, such as IBM common stock, for each time bin over a predetermined amount of time in the past, such as the last 21 days, is computed. This computation may reveal that 10% of IBM share volume typically has traded in the 9:30-10:00 time bin. Similar percentages are determined for each time bin.

At step 204, the computed share volume numbers are subjected to smoothing relative to a standard such as the S&P 500 in order to eliminate the effect of any anomalies occurring during the time period being analyzed, such as, for example, an unusually large volume transacting in any one day. The smoothed share volume V* (expressed in percentage) is calculated as follows for each time bin:

$$V^*_{IBM, 9:30-10} = \beta V_{IBM, 9:30-10} + (1-\beta) V_{S\&P500, 9:30-10} \quad (1)$$

where: β=a constant for the stock in question (IBM) having a value in the interval [0,1] $V_{X, 9:30-10}$=the percentage of the 21-day average share volume for security (or index) X that occurs within the 9:30-10:00 time bin The adjusted share volume percentage for each bin is then multiplied at step 205 by the number of shares in the customer order (in the example, 100,000 shares). This results in an unrounded distribution of shares over all of the time bins of the trading day. At step 206, the obtained share distribution is converted to a round lot (i.e., multiples of 100 shares) distribution. The share distribution thus obtained dictates how many shares must be transacted within each time bin during the trading day.

Once this distribution has been obtained, there remains the question as to how the trades scheduled for each time bin will be implemented. The simplest method is to place appropriately sized market orders during each time bin. However, this method is costly, and is not available for trades involving NASDAQ equities trading on ECNs. A preferred methodology of placing orders within each time bin for the VWAP strategy is shown in FIG. 2B.

Referring to FIG. 2B, at step 207 a partial amount of the bin is entered at a passive price (i.e., a price better than the market whereby the market must move to the price before execution will occur). For example, if the distribution calculation indicates that 10,000 shares should be transacted in the 9:30-10:00 time bin, 3,300 shares could be entered as a limit order at a passive price. At step 208, the algorithm waits for a predetermined amount of time, such as five minutes. At step 209, a determination is made as to whether the order has been at least partially filled. If so, at step 210 the market is "read," by determining the ratio of bid size to ask size (where bid size is the number of shares at the current bid price, and ask size is the number of shares at the current ask price). If the market is adverse to the order, such as where bid size greatly outnumbers ask size for a buy order, then at step 212 the shares remaining in the bin are rapidly transacted by placing aggressively priced limit orders, and if still unfilled after a certain period of time, by placing market orders. If no adverse market trend is found, then another passively priced limit order is placed at step 207.

If the order has not been filled, at step 213 the process waits for an additional predetermined time period, such as another five minutes. At step 214 it is again determined whether the order has been at least partially filled. If so, the process proceeds to step 210. If not, at step 215 the market is read by looking at bid/ask ratio and the spread size. If the current market trend is adverse, or the spread is very tight, as determined at step 216, then the bin is completed with market orders at step 217. If not, at step 218, the limit order is modified according to present market conditions, and is placed again at step 207. This cycle repeats until all shares for the bin are traded, or until the time period for the particular bin expires.

If the time period expires with unexecuted trades remaining, all unexecuted shares for that bin are sent as market orders. Of course, in determining the expiration of the time period, enough time has to be remaining to be able to execute the market orders. Thus, according to one embodiment of the invention, the time period is considered to have "expired" a few minutes (e.g., 2.5 minutes) before the end of the customer's specified expiration time, to allow enough time to complete the customer's order within the customer's specified expiration time.

Further, an additional predetermined waiting period and order status determination step may be performed between steps 214 and 215.

As shown in FIG. 1, it is possible to send different allocations of shares of an order to different trading forums. For example, a certain amount of shares for a particular bin may be sent to the POSIT® system for off-market crossing while the remaining shares may be sent to an ECN as limit orders.

In alternative embodiments of the VWAP trading algorithm according to the present invention, a stop-loss feature can be incorporated. This feature would automatically and continuously observe market indicators relating to securities for which there are pending VWAP orders to determine if adverse market trends would make it more profitable for trading according to the VWAP strategy to be terminated. In the event that this happens, the VWAP order could potentially be sent to an outside trading forum as market or limit order, or the order can be automatically routed to a different server on the network so as to be trading according to a different and more advantageous strategy.

Figure 3:
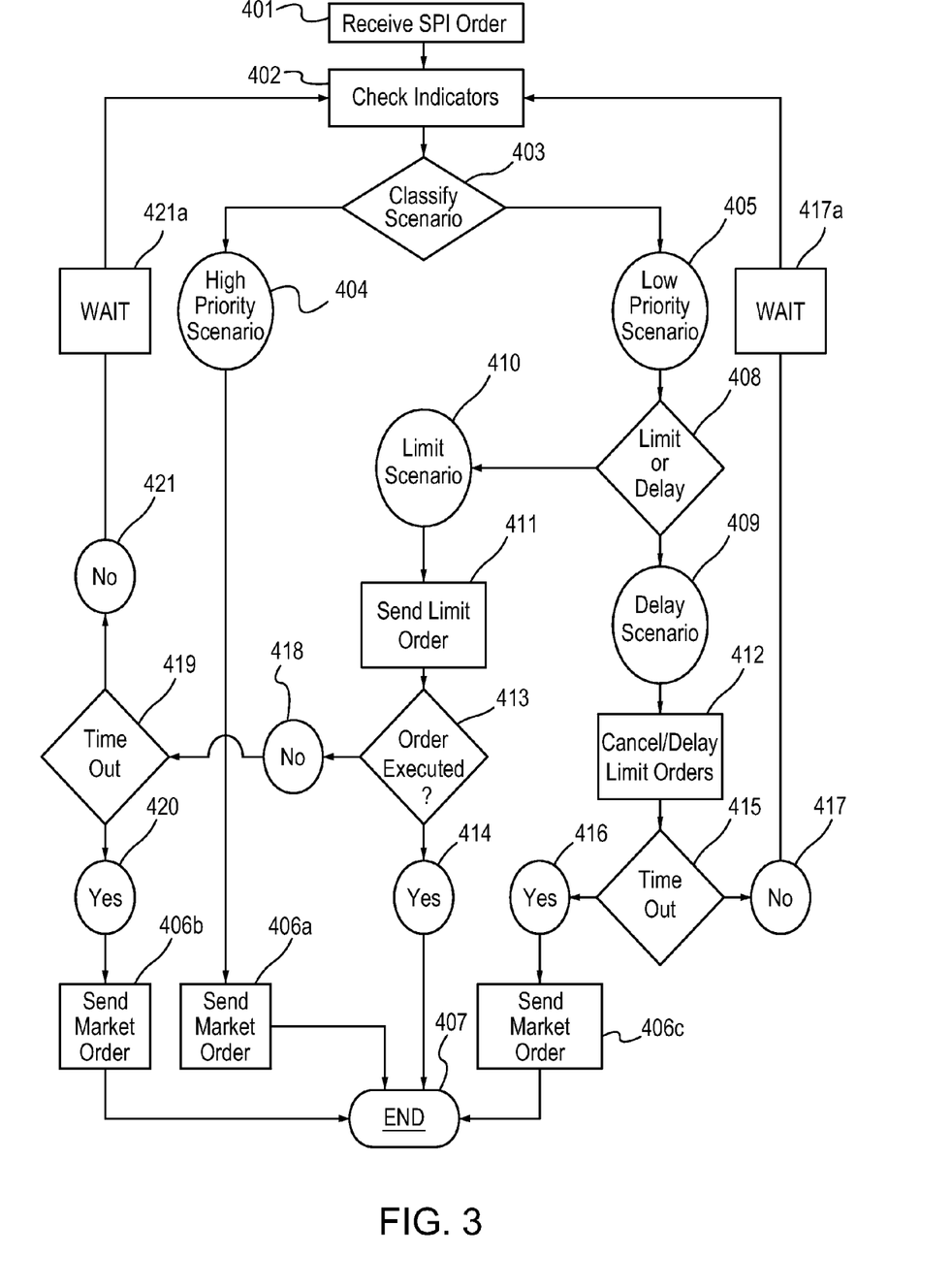
FIG. 3 is a flow chart of a second exemplary trading algorithm which can be performed by a server according to an embodiment of the present invention.

FIG. 3 illustrates a second exemplary trading strategy, called Short-term Price Improvement (SPI), which may be implemented on servers 11 of the present invention. The SPI strategy is designed to complete all orders within a maximum time frame specified by the customer, preferably 30 minutes or less, while optimizing the transaction price within the desired time frame. In other words, clients submitting orders stating "buy 5,000 shares of IBM within 20 minutes" to a server running the SPI strategy are essentially stating a desire to purchase 5,000 shares of the stock at the best (lowest) price within the 20 minute time frame. Orders placed to a SPI server would serve as an alternative to a market order where the client's time horizon is relatively short.

The SPI strategy server continuously receives and monitors a variety of market indicators in order to determine the best way to execute a given client order. Depending upon short-term price forecasts and market timing analysis based upon these market indicators as is known in the art, a server performing the SPI strategy at any point during the time frame may generate a signal which causes any of three separate courses of action to be taken by the server: 1) attempt to execute the client order as a market order, 2) attempt to execute the client order as a limit order having a price set at one of various levels of aggressiveness, or 3) delay the client order for a short period and wait to see how the market indicators change (and thereby change the signal being generated by the SPI strategy server).

According to embodiments of the invention having such a SPI server, the market indicators are preferably received in real time, such as electronically by an independent real time market information provider 15. The SPI algorithm thus can react to changing market conditions as evidenced by the indicators to determine the appropriate pricing and timing of orders. As market conditions change, the SPI algorithm can modify its outstanding orders in response to received real-time market data.

Suitable market indicators for SPI orders include, but are not limited to, moving average convergence/divergence ("MACD") which is a money flow momentum indicator, fast stochastic which is an indicator of price oscillation, Bollinger bands which is a volatility indicator, and buying directional movement index ("$DMI_B$") and selling directional movement index ("$DMI_S$") which are demand/supply momentum indicators. As will be readily appreciated by one skilled in the art, various market indicators, including indicators known in the art and proprietary indicators, can be used in algorithms of the present invention to generate signals.

FIG. 3 depicts an embodiment of an algorithm to perform the SPI strategy according to preferred embodiments of the present invention. At the beginning of the process, the server 11 dedicated to running the SPI strategy receives the SPI order 401 via the network 10. The SPI order must include a trade side (buy or sell), a security identifier (ticker symbol), a number of shares, and a time period. Optionally, a default time period can be set, such as 15 minutes, which would be used as the time period in the event the SPI order failed to state a specific time period.

At step 402, the SPI server checks the market indicators, and then classifies 403 the pending SPI order as either a high priority scenario 404 or a low priority scenario 405 according to a set of predetermined criteria. According to preferred embodiments of the invention, high priority scenarios are infrequent and they occur only when indicators predict market movements which would make it advantageous to complete the client's requested trade immediately. In the event that a high priority scenario 404 is identified at 403, a signal is generated whereby the client order is immediately executed as a market order 406a, and the SPI server algorithm ends 407. At this point, the client would typically be notified, preferably electronically, that its trade had been completed.

A high priority scenario also may be identified by making a "stop-loss" assessment. According to this evaluation, a threshold level is generated based on a number of various market factors, and the current price of the security is compared to the threshold. If the current price is on the wrong side of the threshold for the given order (i.e., above the threshold for a buy order or below the threshold for a sell order), this constitutes a high priority situation and the order is sent as a market order. Examples of generating a stop-loss threshold are as follows.

For a buy order, the current ask price is obtained. An increment is generated based on the measured volatility of the security over the last 55 ticks. The generated increment is added to the ask price. The new stop-loss threshold is the minimum of the old threshold (e.g. from one minute ago) or the ask-plus-increment. Thus, the threshold can never increase, but only decrease. If prices are moving in favor of the buy order (i.e., lower), the threshold is lowered, but if prices are moving adverse to the buy order (i.e., higher), the threshold remains the same. Consequently, if the ask price ever exceeds the threshold, a high priority situation is identified.

For a sell order, the situation is reversed. In particular, the current bid price is obtained. An increment is generated based on the measured volatility of the security over the last 55 ticks. The generated increment is subtracted from the bid price. The new stop-loss threshold is the maximum of the old threshold (e.g. from one minute ago) or the bid-minus-increment. Thus, the threshold can never decrease, but only increase. If prices are moving in favor of the sell order (i.e., higher), the threshold is raised, but if prices are moving adverse to the sell order (i.e., lower), the threshold remains the same. Consequently, if the bid price ever retreats below the threshold, a high priority situation is identified.

Table 1 below demonstrates several exemplary situations in which market indicators would signal high priority scenarios according to one preferred embodiment of the present invention.

TABLE 1

| Side | Fast Stoch. | Boll. Bands | MACD |
|------|-------------|-------------|--------|
| Buy  | Oversold    | NA          | Strong |
| Sell | Overbought  | NA          | Weak   |
| Buy  | NA          | Above       | Strong |
| Sell | NA          | Below       | Weak   |

Referring to Table 1, if, for example, at step 403 the MACD indicator signaled weak price and money flow momentum and the fast stochastic indicator signaled overbuying of the particular security, then a high priority scenario would be triggered for client sell orders. Similarly, a strong MACD combined with a market price below the Bollinger Bands would also trigger a high priority scenario for client sell orders. In either case, a signal would be generated which would cause a market order to be sent at 406*a* to satisfy the initial client SPI order received at step 401.

In the event that no high priority scenario 404 is triggered, the client SPI order is deemed a low priority scenario 405 and thus an immediate market order is not triggered at 406*a*. At step 408, the SPI server decides whether to submit a limit order 410, or to delay 409 the client order. It will be readily appreciated by one skilled in the art that such limit orders can be placed with a variety of prices, including, but not limited to, the current bid price, the current ask price, or the mid-point price of the bid-ask spread, according to a series of predetermined criteria at step 411. As with the determination at step 403 as to whether a high priority scenario 404 exists, the decision at step 408 as to whether a limit order or hold is appropriate, and the appropriate price for a limit order, is made upon the monitoring of various market indicators.

Table 2 below demonstrates an exemplary methodology for using market indicators to dictate whether a limit order (and its price) or a delay should be signaled according to one preferred embodiment of the present invention.

TABLE 2

| Side | $DMI_B$    | $DMI_S$    | Action      | Price     |
|------|------------|------------|-------------|-----------|
| Buy  | Mid range  | NA         | Limit Order | Bid       |
| Buy  | High range | NA         | Limit Order | Mid-point |
| Buy  | Low range  | NA         | Hold        | NA        |
| Sell | NA         | Mid range  | Limit Order | Ask       |
| Sell | NA         | High range | Limit Order | Mid-point |
| Sell | NA         | Low range  | Hold        | NA        |

According to the sample priority rules depicted by Table 2, it can be seen that for client buy orders, if at step 408 the $DMI_B$ is in the high range (as defined by the Bollinger Bands as is known in the art), a limit order would be signaled and then submitted at step 411 having a price equal to the mid-point of the bid-ask spread. Similarly, for a client sell order, a low $DMI_S$ (as defined by the Bollinger Bands) causes step 408 to signal and initiate a delay scenario 409.

If a delay scenario 409 is initiated, all pending limit orders relating to the client order in question are canceled at step 412. Conversely, if a limit scenario 410 is initiated, a limit order is either submitted to the market, a currently pending limit order has its price modified, or a currently pending limit order is left undisturbed (i.e., when there is no change in the signaled limit order aggressiveness) at step 411 based upon the algorithm's low priority rules (such as the sample rules given by Table 2) and whether there already is a previously submitted and unexecuted limit order. The server checks at step 413 to see if a pending limit order was executed by the market. If a pending limit order has been executed 414, then the client order is filled and the algorithm ends 407.

If the limit order placed at step 411 is still pending 418, or if a hold has been placed at step 412, the algorithm checks at 419 and 415, respectively, to see if the time constraint placed on the order has expired. In the event that the time constraint has expired (416 or 420), the SPI server sends a market order at 406*b* or 406*c* to fill the client order. If the time period has not expired (421 or 417), the algorithm returns to step 402 after waiting for a predetermined amount of time (421*a* or 417*a*).

In preferred embodiments of the present invention, the timing out function performed at steps 419 and 415 by the SPI server algorithm will have a time constraint which is approximately three minutes less than the time period associated with the particular client order. For example, if a client order requests a sale of 500 shares of IBM within 25 minutes and no high priority scenario have been triggered and no limit orders have been executed 22 minutes after the client submitted the order, then a timing out 416 or 420 would occur and a market order would be sent 406*b* or 406*c*. This three minute time period is preferred because it is the maximum expected time necessary to execute a market order. Thus, it helps to ensure that any client order will be executed before the client specified time horizon expires.

As will be readily understood by one of ordinary skill in the art, the flowchart depicted by FIG. 3 has been described with reference to one iteration of a repeating cycle. During the entire transaction period as specified by the client in its SPI order, the market indicators are continuously updated and reviewed at step 403 to determine whether a high priority scenarios 404 is signaled, and are reviewed at step 408 to determine if a limit order 410 or delay 409 is signaled. The algorithm of FIG. 3 will continue to cycle, once every minute for example, back to step 402 and repeat until either: 1) a market order is signaled at step 406*a* due to a high priority scenario, 2) a market order is signaled steps 406*b* and 406*c* due to the transaction period given by the SPI order timing out 417 and 415, or 3) a limit order is executed by the trade forum at 414 before it is modified or canceled. It should be understood then that during the second and subsequent iterations of the above described cycle, at steps 406*b*, 406*c*, 411, and 412 the client order must have previously caused a low priority signal to be generated at step 403 and therefore potentially had a previous limit order submitted at 411. If such a limit order is still pending (unexecuted), it will require the server at steps 406*b*, 406*c*, 411, and 412 to modify (change the price, or switch to a market order) or cancel (to make the order a hold) the pending unexecuted limit order instead of creating a completely new order.

EXAMPLE

A SPI server order is submitted stating a desire to buy 1000 shares of IBM within 10 minutes. During the 7 minute (3 minute cushion for time-outs) interval in which the SPI algorithm operates, conditions transpired as in Table 3:

TABLE 3

| Time   | Bid     | Ask     | Priority: Signal  |
|--------|---------|---------|-------------------|
| 1 min. | 112.000 | 112.250 | Low: Limitat bid  |
| 2 min. | 112.000 | 112.250 | Low: Limitat bid  |
| 3 min. | 112.125 | 112.375 | Low: Limitat bid  |
| 4 min. | 112.125 | 112.375 | Low: Limitat bid  |
| 5 min. | 112.000 | 112.250 | Low: Hold         |

TABLE 3-continued

| Time | Bid | Ask | Priority: Signal |
|---|---|---|---|
| 6 min. | 111.875 | 112.125 | Low: Hold |
| 7 min. | 111.875 | 112.125 | NA: Timeout |

For purposes of this example it will be assumed that one iteration of the cycle described with reference to FIG. 3 occurs each minute. Over the first six minutes, no high priority scenarios are signaled. During the first minute a limit order for 1000 shares is submitted at the bid price (112) according to algorithm rules for the low priority indicators. During the third minute, while the indicators have not changed, the spread has changed. This causes the SPI algorithm to cancel and correct the initial limit order sent to a price of 112.125, the new bid price. During the fifth minute, the indicators have changed to signal a delay scenario. Thus, the SPI server cancels the limit order placed during the third minute. By the seventh minute, the trade has not been executed, so a time out action is initialized. Thus, a market order is generated for the 1000 shares and the order is filled.

As will be readily appreciated by one skilled in the art, the server system according to the present invention running a SPI algorithm as depicted can also allow a single client order to be allocated to multiple markets, such as the NYSE, POSIT®, and ECNs, automatically according to current market conditions, or the particular nature of the security in question, in order to achieve optimized results.

Also, in alternative embodiments of the present invention, orders can be automatically transferred within the network from one server operating according to a first strategy algorithm to another server having a second different strategy algorithm. For example, the VWAP strategy algorithm can be modified such that the shares allocated to each 30 minute time bin are transferred to the SPI server for execution with a 25 minute time horizon.

Furthermore, in embodiments of the present invention, an order submitted to any one of the servers of the present invention can aggregated in whole or in part with one or more different orders submitted to the same or different servers. This pooling of orders can be done to limit trading transaction costs or when such pooling would achieve a better price for each order.

Additionally, it should be understood that orders submitted to any server according to the present invention can optionally be split for execution by a plurality of trade forums. For example, a portion of a VWAP buy order can be crossed internally (at the VWAP) with a different VWAP sell order by the server, and the remainder of the VWAP buy order can be submitted to an ECN as a limit or market order for execution.

The invention being thus described, it will be apparent to those skilled in the art that the same may be varied in many ways without departing from the spirit and scope of the invention. Any and all such modifications are intended to be included within the scope of the following claims.

We claim:

1. A computer implemented method for executing block trades for a security, comprising:
   receiving a block trade request, at a computer system, said block request including data representing a quantity of shares of the security to be traded over a period of time and a trading strategy to be employed;
   dividing, via said computer system, the period of time into a plurality of time bins;
   within a computer system, for the received block trade request, computing, for each time bin, a number of shares to be traded as a trading target based on at least historical trading volumes using predictive analysis and said trading strategy;
   for a first time bin, generating, via said computer system, executable trade orders for a number of shares to be traded that is less than the trading target for the first time bin; and
   executing, via said computer system, at least a portion of said executable trade orders in a trade forum within each time bin in the future.

2. The method of claim 1, wherein executable trade orders of an allocated number of shares within a given time bin includes at least one limit order during said given time bin, with a price and time for each limit order being determined as a function of both an amount of time remaining in said given time bin and real-time assessments of current market conditions based on real-time market data.

3. The method of claim 1 further comprising the steps of:
   periodically checking the status of outstanding executable trade orders; and changing at least one of the pricing and the number of shares of an outstanding executable trade order as a function of both an amount of time remaining in said given time bin and real-time assessments of current market conditions based on real-time market data.

4. The method of claim 1 further comprising the steps of:
   identifying securities for which said computer system has received a block trade request on both a buy side and a sell side; and
   internally transferring shares of such identified securities from a seller to a buyer at a price determined according to the conditions specified in said requests for said identified securities.

5. The method of claim 1, wherein said executable trade orders comprise limit orders for at least partial amounts of said allocated numbers of shares within each bin, the method further comprising the steps of:
   determining after a predetermined period of time whether said limit orders have been at least partially filled;
   if said limit orders have been at least partially filled, determining whether adverse market conditions exist, and changing the remaining share orders to more aggressive limit orders or market orders for immediate execution if adverse conditions exist, otherwise, entering additional limit orders for partial amounts of said allocated numbers of shares within said time bins.

6. The method of claim 5, further comprising the steps of:
   determining whether adverse market conditions exist if said limit orders have not been at least partially filled after a predetermined period of time;
   completing the orders within said time bins by placing more aggressive limit orders or market orders if adverse market conditions exist;
   otherwise, modifying said partial limit orders within said time bins and placing said modified limit orders within said time bins.

7. The method of claim 1, further comprising the step of smoothing said determined share volume percentages according to a predetermined algorithm.

8. The method of claim 1 wherein said generating step includes a step of continuously monitoring a plurality of market indicators related to said security, and said monitoring of said indicators is performed automatically by said computer system using information provided by an electronic real-time information provider.

9. The method of claim 1, wherein the period of time is a trading day for the trade forum.

10. The method of claim 1, wherein determining historical share volume percentages for said security for each time bin comprises:
- for each time bin in a first subset of the plurality of time bins, setting the percentage to a quotient of the historical average share volume for said security for that time bin over a predetermined period of time in the past divided by the sum of the historical average share volume for said security for all of the time bins in the first subset over a predetermined period of time in the past; and
- for each time bin not in the first subset, setting the percentage to a predetermined value.

11. The method of claim 1, wherein the computing step computes said number of shares to be traded as said trading target using round lots.

12. The method of claim 1, further comprising steps of:
- determining after a predetermined amount of time, a number of shares executed in said executing step;
- generating a second executable trade orders for a number of share to be traded that is equal to said trading target in the time bin minus said number of shares executed in said executing step; and
- executing said generated second executable trade orders in the time bin.

* * * * *

UNITED STATES PATENT AND TRADEMARK OFFICE
CERTIFICATE OF CORRECTION

| | | |
|---|---|---|
| PATENT NO. | : 8,751,363 B2 | Page 1 of 1 |
| APPLICATION NO. | : 13/184790 | |
| DATED | : June 10, 2014 | |
| INVENTOR(S) | : David C. Cushing et al. | |

It is certified that error appears in the above-identified patent and that said Letters Patent is hereby corrected as shown below:

In the Specification

Column 1, line 9, after "2009," insert -- now U.S. Pat. No. 7,983,982 --.

Signed and Sealed this
Seventh Day of April, 2015

Michelle K. Lee
*Director of the United States Patent and Trademark Office*